United States Patent [19]

Abramson et al.

[11] 3,787,627

[45] Jan. 22, 1974

[54] CENTRAL ADDRESS DISTRIBUTOR

[75] Inventors: Carl Newton Abramson, Somerville; Mark T. Nadir, Warren, both of N.J.

[73] Assignee: Adaptive Technology, Inc., Piscataway, N.J.

[22] Filed: Dec. 15, 1971

[21] Appl. No.: 208,261

[52] U.S. Cl. ........................ 179/15 BA, 179/15 AL

[51] Int. Cl. ............................................ H04j 5/00

[58] Field of Search ....... 179/15 AL, 15 BA, 15 AS; 340/172.5

[56] References Cited

UNITED STATES PATENTS

| | | | |
|---|---|---|---|
| 3,643,030 | 2/1972 | Sparrendahl | 179/15 AL |
| 3,646,273 | 2/1972 | Nadir | 179/15 BA |

*Primary Examiner*—Kathleen H. Claffy
*Assistant Examiner*—David L. Stewart

[57] ABSTRACT

An address-coded communication system is disclosed wherein the size of the address set required in the system is reduced essentially to the maximum number of stations communicating at any time, as contrasted with requiring an address set size equal to the number of stations located in the system. Specifically, a central address distributor is provided which distributes available identifying address codes on the transmission medium in a manner which makes such address codes available to communicating stations for the duration of a link. In one embodiment, a station desiring to go on line makes a bid for an identification address from the central address distributor and by means of a special handshaking technique, the central address distributor assigns an identification address to that user. When such station terminates the call, it returns its assigned address to the central address distributor so that such address can subsequently be re-assigned to another station or user. Special subperiods are assigned within a period for both sending addresses being distributed from the central address distributor, and for returning the addresses from the stations to the central address distributor after use. In another embodiment, the central address distributor continuously polls the stations of the system to determine which addresses are in use at a given time. This is accomplished by generating addresses at the distributor and inserting the addresses, one at a time, into a special polling subperiod which is sent around the entire system. If this address is removed from the transmission line and absorbed by a station or mutilated by the system and therefor not returned to the central address distributor, then it is assumed the address is in use. On the other hand, if this address returns on the line to the central address distributor, this indicates that the address is not in use and, consequently, is placed in a storage register containing available addresses. The available addresses are subsequently sent by the distributor on the line in designated address distributor subperiods from which any station can remove and use an address on a first come basis. In this embodiment, after a station terminates a call and is through using an address, it need not return the address directly to the central address distributor since such distributor is continuously polling the stations to determine which addresses are in use. The central address distributor permits reduction of the size of the address set required, resulting in economizing on system bandwidth and increased system efficiency.

29 Claims, 9 Drawing Figures

PATENTED JAN 22 1974

3,787,627

SHEET 8 OF 9

CENTRAL ADDRESS DISTRIBUTOR

BACKGROUND OF THE INVENTION

1. Field OF THE Invention

The present invention relates to address-coded data communication systems.

2. Description of the Prior Art

The invention has particular application to address-coded data communication systems wherein communications between a plurality of remote stations over a common transmission line or a loop is carried out by sending address tags identifying the source, destination or routing of separate units of text data, rather than by employing time or frequency multiplexing schemes. In an address-coded data communication system, the address intelligence and the data intelligence are expressed and transmitted in a form which permits the intended receiving station to distinguish the intelligence from other data carried on the transmission line solely by means of the address tag and not by means of frequency or time reserved channels. One type of address-coded data communication system is commonly referred to as an "asynchronous time division multiplex system."

In conventional address-coded data communication systems, essentially each station, subscriber or user is assigned a unique address code. Apparently, as the number of connection stations becomes larger, the required number of unique address codes also increases proportionally. As the address set increases, the total amount of information needed to specify a unique address code also increases. For example, a system having 1,000 stations requires 1,000 unique addresses assigned to identify each station. Where a binary coded system is employed, a 10 bit address would be needed for purposes of identifying the full 1,000 stations.

Since the system bandwidth or the efficiency of an address-coded data communication system is related to the size of the address set required, there presently exists a need to retain the higher efficiency that results from using small address sets without thereby being limited in the number of stations which may be interconnected.

SUMMARY OF THE INVENTION

It is an object of the present invention to increase the efficiency of data transfer in address-coded data communication systems.

It is another object to economize on system bandwidth in an address-coded data communication system.

It is another object to provide for block length compression in an address-coded data communication system.

It is another object to provide an address-coded data communication system which operates with an address set having a minimum size.

It is another object to provide an address-coded data communication system which provides flexibility in allocating communicating addresses.

It is still another object to provide a technique for polling the stations in an address-coded data communication system as to their use or non-use of certain system information.

It is a further object to provide a technique for communicating information between a central station and member stations in an address-coded data communication system.

These and other objects, which will become apparent from the detailed disclosure and claims to follow, are achieved by the present invention which provides a central address distributor connected in an address-coded communication system for for distributing available identifying address codes on the transmission medium in a manner which makes such address codes available to communicating stations for the duration of a link. The central address distributor comprises means for generating addresses for identifying stations in the sytem; a logic circuit for determining which of such addresses are not in use by any of the stations at a given time; a storage circuit connected to such logic circuit for storing those addresses which are not in use and may be made available to stations; and means for sending such stored addresses onto a transmission medium to stations desiring to enter the line. In one embodiment, a station desiring to go on line makes a bid for an identification address from the central address distributor and by means of a special handshaking communications technique, the central address distributor sends an available identification address from its storage circuit on to the transmission medium for use by that or another station desiring to communicate. When such station terminates the call, it returns its assigned address to the central address distributor so that such address can subsequently be distributed to the system for use by another station or user. Special subperiods are assigned within a period for both sending addresses being distributed from the central address distributor, and for returning the addresses from the stations to the central address distributor after use.

In another embodiment, the central address distributor continuously polls the stations of the system to determine which addresses are in use at a given time. This is accomplished by generating polling addresses at the distributor and inserting the addresses one at a time, into a special polling subperiod which is sent around the entire system. If this polling address is removed from the transmission line and absorbed by a station or multilated by the system and therefore not returned to the central address distributor, then it is assumed the address is in use. On the other hand, if this polling address returns on the line to the central address distributor, this indicates that such address is not in use and, consequently, is placed in the storage circuit containing available addresses. The available addresses are subsequently sent by the distributor on the line in designated address distributor subperiods from which any station can remove and use an address on a first come basis. In this embodiment, after a station terminates a call and is through using an address, it need not return the address directly to the central address distributor since such distributor is continuously polling the stations to determine which addresses are or are not in use.

Thus the central address distributor provides reduction of the size of the address set to essentially that number of stations communicating at a given time.

It is to be understood that, as used herein, the term "station" includes at least all or a part of the users, subscribers, pieces of equipment, terminals or other members of a communications system which are individually identified by a unique address. Accordingly, these terms are to be used synonymously herein.

It also to be understood that, as used herein, the term "SI" is intended to mean station identifier and is to be used synonymously with the term "address."

It is also to be understood that, as used herein, the term "period (P)" is intended to means some known number of clock counts or, alternately, a known time interval. Also the term "START OF PERIOD IDENTIFIER" or "SOPI" is intended to mean that portion of the period (P) for communicating timing and other synchronization information. The period (P) also includes discrete subperiods (SIP) which are individually assigned with handshaking and control meanings, and text data meanings known to the stations.

DESCRIPTION OF THE PREFERRED EMBODIMENTS

Figure 1:
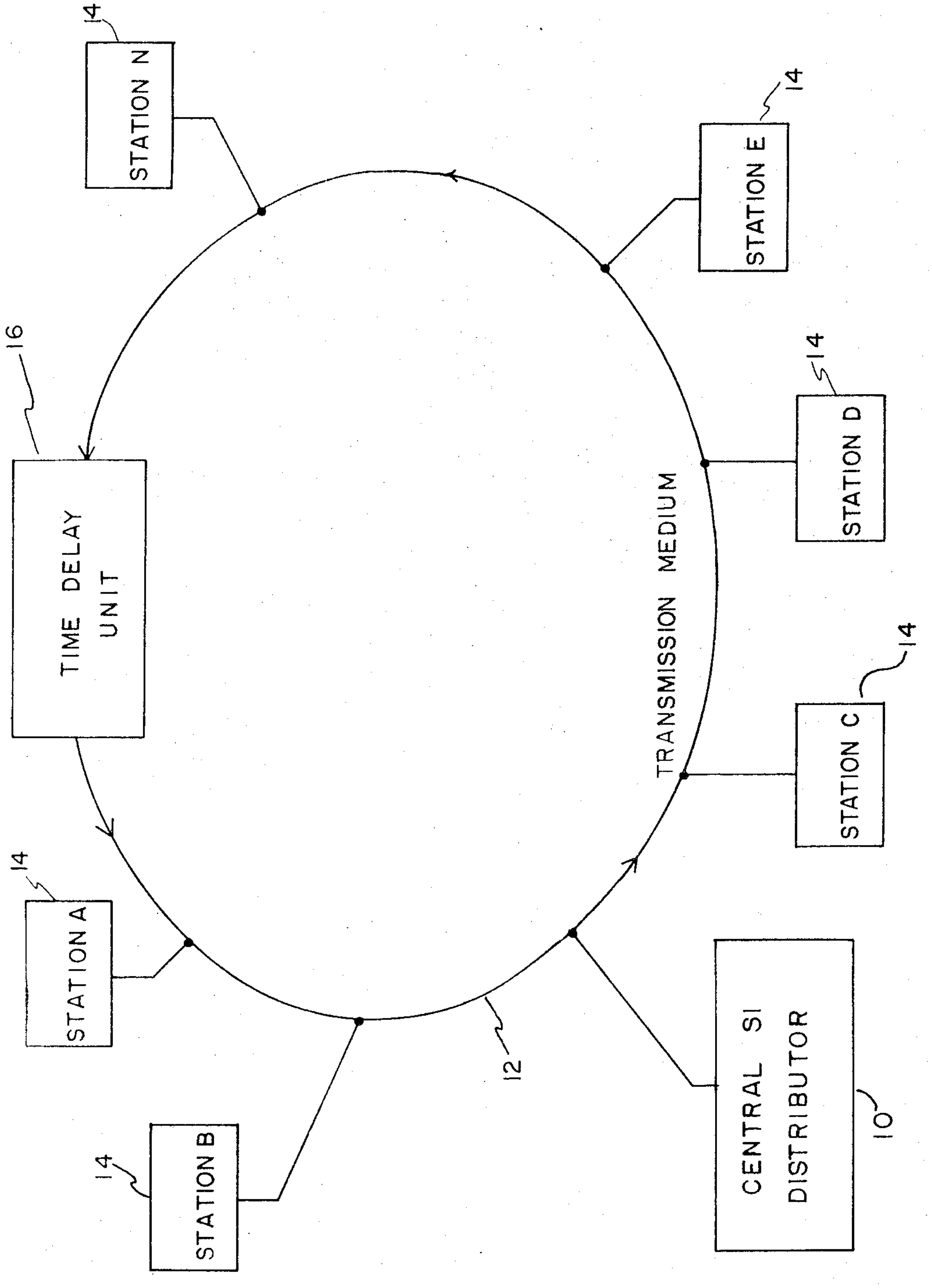
FIG. 1 is a general block diagram showing a central SI distributor connected in an address-coded data communications system, illustrative of the present invention.

Referring to FIG. 1 there is shown a general block diagram of an address-coded data communications system having a central SI (address) distributor 10 connected to a transmission medium 12. Also connected to the transmission medium 12 are a plurality of stations 14 which receive data from and send data on to the transmission medium 12. A time delay unit 16 is employed to synchronize the periods (P) and match the timing of the clock pulses and the data sent in the subperiods (SIP) so that the data is circulated on the transmission medium 12 in proper time relationship. This action of the delay unit 16 is commonly referred to as "justification" of the clock pulses and/or periods (P), and/or SIP. This "justification" function performed by the time delay unit 16 essentially assures that the periods (P) remain as discrete integral units on the transmission medium 12 without overlapping on each other as a result of transmission line delays and the shift register delays accompanying the serial shifting of data through shift registers located at the stations on the transmission medium 12. Time delay unit 16 comprises circuitry, such as manually adjustable delay lines for making timing adjustments on a bit-by-bit basis and contains delays of less than one bit in a duration. It is noted that a closed-loop transmission system is shown in FIG. 1 for purposes of explaining the subject invention in a simple and clear manner. Therefore, the present invention is not to be limited to closed-loop transmission systems, respectively.

The central SI distributor 10 shown in FIG. 1 is employed in an address-coded data communication system wherein communications between a plurality of stations 14 over the common transmission medium 12 is carried out by sending addresses identifying the sources, destination, or routing of separate units of text data.

One such system which is contemplated for use with the central SI distributor 10 is disclosed in copending United States Patent application, Ser. No. 861,947, filed on Sept. 29, 1969 by Carl N. Abramson and Mark T. Nadir and entitled Adaptive System For Information Exchange, now U. S. Pat. No. 3,646,274 issued on Feb. 29, 1972. In this system, the stations operate off of a common reference, or synch, generated by common equipment of the system. The synch enables the stations to identify distinct, repetitive periods (P) as well as the discrete consecutive subperiods (SIP) located within such periods (P). The SIP identification is accomplished by numbering and counting the SIP to determine the position where it appears in its period (P). The SIP are individually assigned with message meanings (words, letters, numbers, symbols or data of any kind) known to the stations. Information is exchanged by inserting, into selected subperiods, signals identifying a sending and/or receiving station so that a receiving station may, in response to the receipt of such signals, derive the message meanings simply by correlating the so-selected subperiods with their assigned message meanings. In this fashion, the signals identify not only the assigned message meaning by its presence in a particular subperiod or SIP, but also identify the sending and/or receiving station. Thus, the message or intelligence is conveyed by employing discrete text subperiods in which an identifying signal (SI) of the sending or receiving station is sent. The receiving station(s) is adapted to detect the SI and, together with counting circuits, determine the exact message meaning conveyed. This meaning may be unique to each pair or group of communication stations. Also, in this system, the station uses its equipment on an "as needed" basis, and the lines and SIP are utilized by others even when the station is on line, but not at that moment sending or receiving information.

Figure 2:
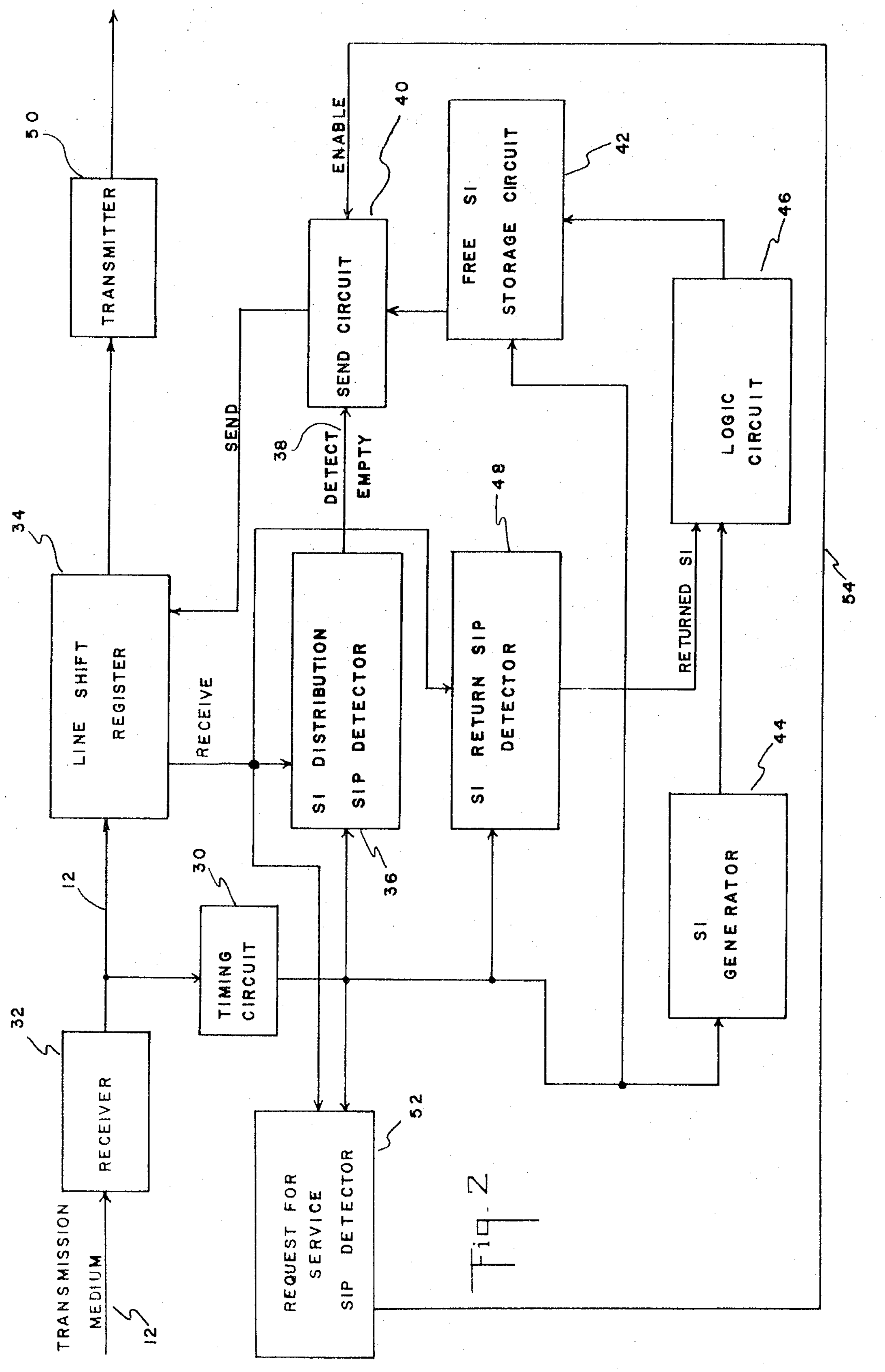
FIG. 2 is a general block diagram of the central SI distributor, illustrative of one embodiment of the system.
Figure 3:
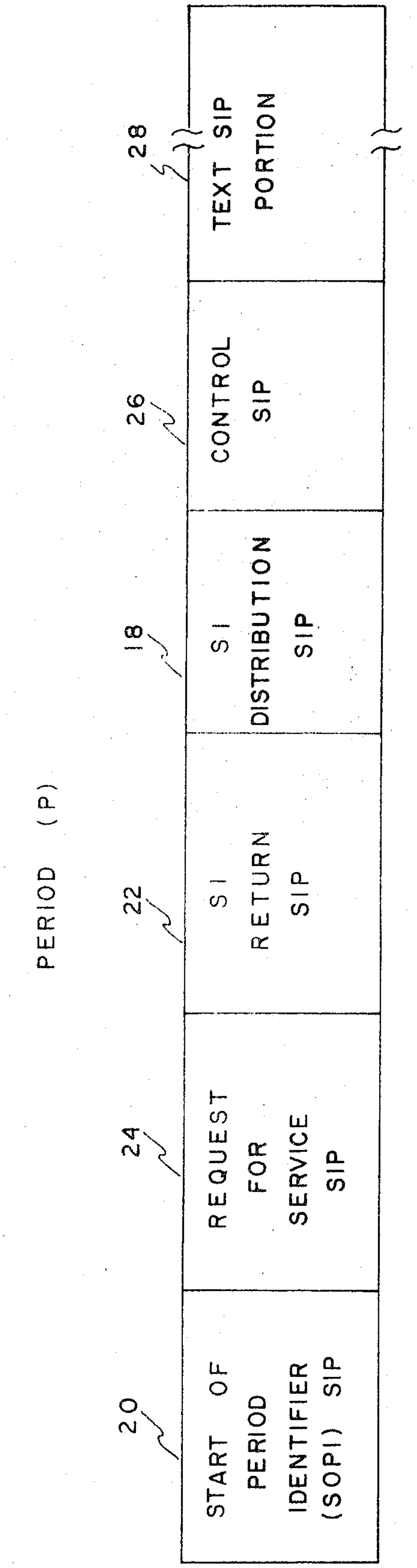
FIG. 3 shows one possible period (P) structure for implementing the central SI distributor shown in FIG. 2.

Referring to FIG. 2, there is shown a circuit function block diagram of one embodiment of the central SI distributor 10 wherein the distributor 10 is accessible to the stations through specially assigned handshaking subperiods (SIP) within the period (P), as shown in FIG. 3. Generally, the central SI distributor 10 employs a SI Distribution SIP 18 which is monitored by all stations of the system. The SI Distribution SIP 18 is located at a given position within each period (P), and timing and other synchronization information are contained in a Start-Of-Period-Identifier (SOPI) SIP 20 located at another fixed position within the period (P) so that each station can detect the individual SIP positions within the period. The central SI distributor 10 inserts available SI (identifying addresses) into SI Distributor SIP 18 from which any station desiring to go on line can remove the SI therefrom. The central SI distributor 10 has means for detecting if the SIP 18 is empty and, consequently, continuously inserts available distribution SI into the SIP 18 as they are removed by the stations for use. When a station terminates its communication on the line, it returns the distribution SI to the central SI distributor 10 by means of a SI Return SIP 22. While the central SI distributor 10, described above, inserts available distribution SI into the SIP 18 without receiving any previous requests from stations for such distribution SI, one alternate technique for assigning these distribution SI to the stations is to employ a Request For Service SIP 24 wherein a station makes a bid for a SI by sending a code in the Request For Service SIP 24. This code may, for example, represent the address of the central SI distributor 10 and, therefore, is detected by the distributor 10 as a request for an available distribution SI. In response the central SI distributor 10 inserts available SI on the line in the SI Distribution SIP 18. The period (P) also includes a Control SIP portion 26 and a Text SIP portion 28.

Referring again to FIG. 2, the central SI distributor 10 includes a timing circuit 30 connected to the transmission medium 12 for deriving the necessary timing functions from the SOPI SIP 20 appearing on the line within each period (P). Data on the transmission medium in received in receiver circuit 32 and passed in serial bit form through a Line Shift Register 34 where such is examined by the various detection circuits within the central SI distributor 10. Specifically, the SI Distribution SIP Detector 36 receives timing signals from the timing circuit 30 at the precise time when the SI Distribution SIP appears in the Line Shift Register 34. Detector 36 in turn indicates on line 38 whether the SI Distribution SIP is empty and sends an enable signal on line 38 to a Send Circuit 40. Send Circuit 40, when enabled by the signal on line 38, inserts an available SI from a Free SI Storage Circuit 42 into the Line Shift Register 34 in the SI Distribution SIP position within the period (P). The available SI stored in circuit 42 are initially provided from a SI Generator 44 which is essentially a counter circuit producing a known number of counts indicative of each of the SI constituting an address set. A Logic Circuit 46 receives the SI produced in SI Generator 44 and inserts them into the Free SI Storage Circuit 42. As the SI stored in the circuit 42 are sent on the transmission medium 12 for distribution to stations, the Logic Circuit 46 does not re-insert the same individual SI back into the Storage Circuit 42 unless these SI have been returned by the stations after use. Accordingly, the SI Return SIP Detector 48 is connected to the timing Circuit 30 and the Line Shift Register 34 so as to receive the distribution SI as they are returned by the stations in the SI Return SIP 22. The Detector 48 receives the returned SI and places it into the Free SI Storage Circuit 42 by way of the Logic Circuit 46. Subsequently, this returned SI is re-distributed to another station for use by means of the Send Circuit 40, the Line Shift Register 34 and a suitable transmitter 50.

In operation, a station desiring to go on line detects a free SI appearing in the SI Distribution SIP 18 and clears the SI from the SIP 18 so that it will not be used by other stations. Once this distribution SI is cleared, the SI Distribution SIP Detector 36 detects the SIP 18 as empty and inserts another SI in the same SIP 18 for use by the next ingoing station. One alternate method of allocating the distribution SI involves each station requiring to go on line to make a bid for an identification address (SI) from the central SI distributor 10 by sending a special code in the Request for Service SIP 24. This code is detected by a Request For Service SIP Detector 52 which is connected to the Timing Circuit 30 and the Line Shift Register 34. Upon detection of the special code or address in the Request For Service SIP 24, the detector 52 provides an enable signal on line 54 to the Send Circuit 40. This enable signal on line 54 permits a free SI from the Free SI Storage Circuit 42 to be inserted into the next empty SI Distribution SIP 18 appearing on the transmission medium 12.

When a station is terminating its message or communication, such station returns the SI to the central SI distributor 10 via the SI Return SIP 22. Accordingly, the SI Return SIP Detector 36 detects the presence of a return SI in the SIP 22 so that the central SI distributor 10 can now re-assign the returned SI to another station. In this manner, the central SI distributor 10 maintains a running account of the SI that are on line and those SI located in its storage circuit 42.

Figure 4:
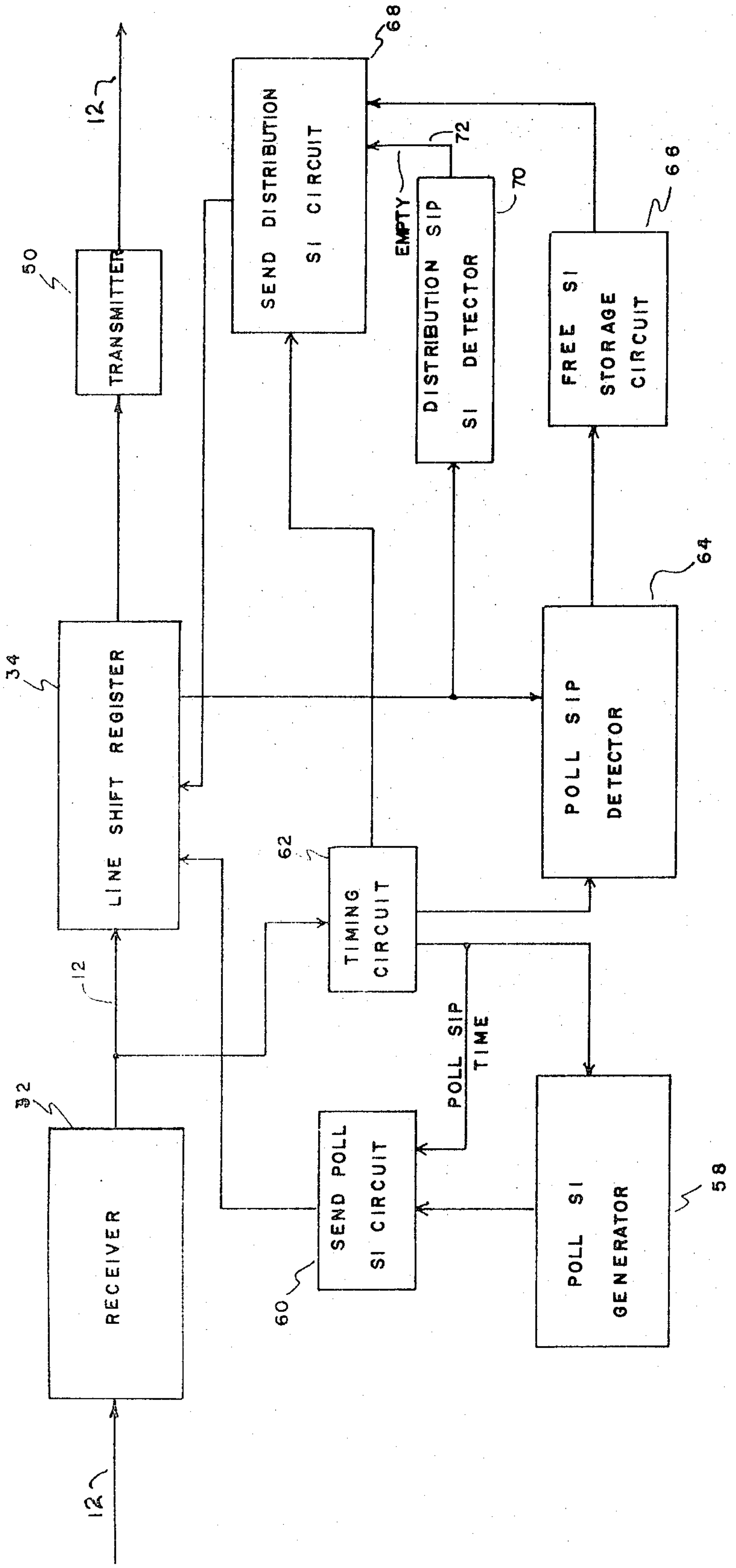
FIG. 4 shows a general circuit block diagram of another embodiment of the central SI distributor.

Referring to FIG. 4, there is shown a general circuit block diagram of another embodiment of the central SI distributor wherein the stations are continuously polled to determine which SI are in use at a given time. The distributor 56 comprises a Poll SI Generator 58 for producing counts indicative of each of the SI constituting an address set. The SI from the Generator 58 are inserted, one at a time, into the Line Shift Register 34 via a Send Poll SI Circuit 60. These SI are inserted into a polling subperiod and sent around the entire system. A Timing Circuit 62 provides the proper poll SIP timing for the Send Poll SI Circuit 60. If the poll SI is removed from the transmission medium 12 by one of the stations and therefore not returned on the line to the central SI distributor 56, then it is assumed the SI is currently in use by one of the stations. On the other hand, if this poll SI returns in the poll SIP to the central SI distributor 56, indicating that the SI is available and not in use, this is detected by a Poll SIP Detector 64 which detects the return of the poll SI and causes the returned poll SI to be inserted into a Free SI Storage Circuit 66 containing available addresses. The available SI are subsequently sent in a SI distribution SIP by means of a Send Distribution SI Circuit 68. Circuit 68 receives an enable signal from a Distribution SIP SI Detector 70 which sends a signal on line 72 indicating that the SI distribution SIP is empty and therefore available for receiving a SI. Send Distribution SI Circuit 68 also receives appropriate timing signals from the Timing Circuit 62. Once the SI are inserted into the SI distribution SIP in the Line Shift Register 34, any of the stations can remove and use the SI on a first come, first served basis. After a station terminates a call and is through using a SI, it need not return the SI directly to the central SI distributor 56, as in the case of the embodiment shown in FIGS. 2 and 3, since the distributor 56 employs the polling SIP to continuously determine which SI are or are not in use.

Figure 5:
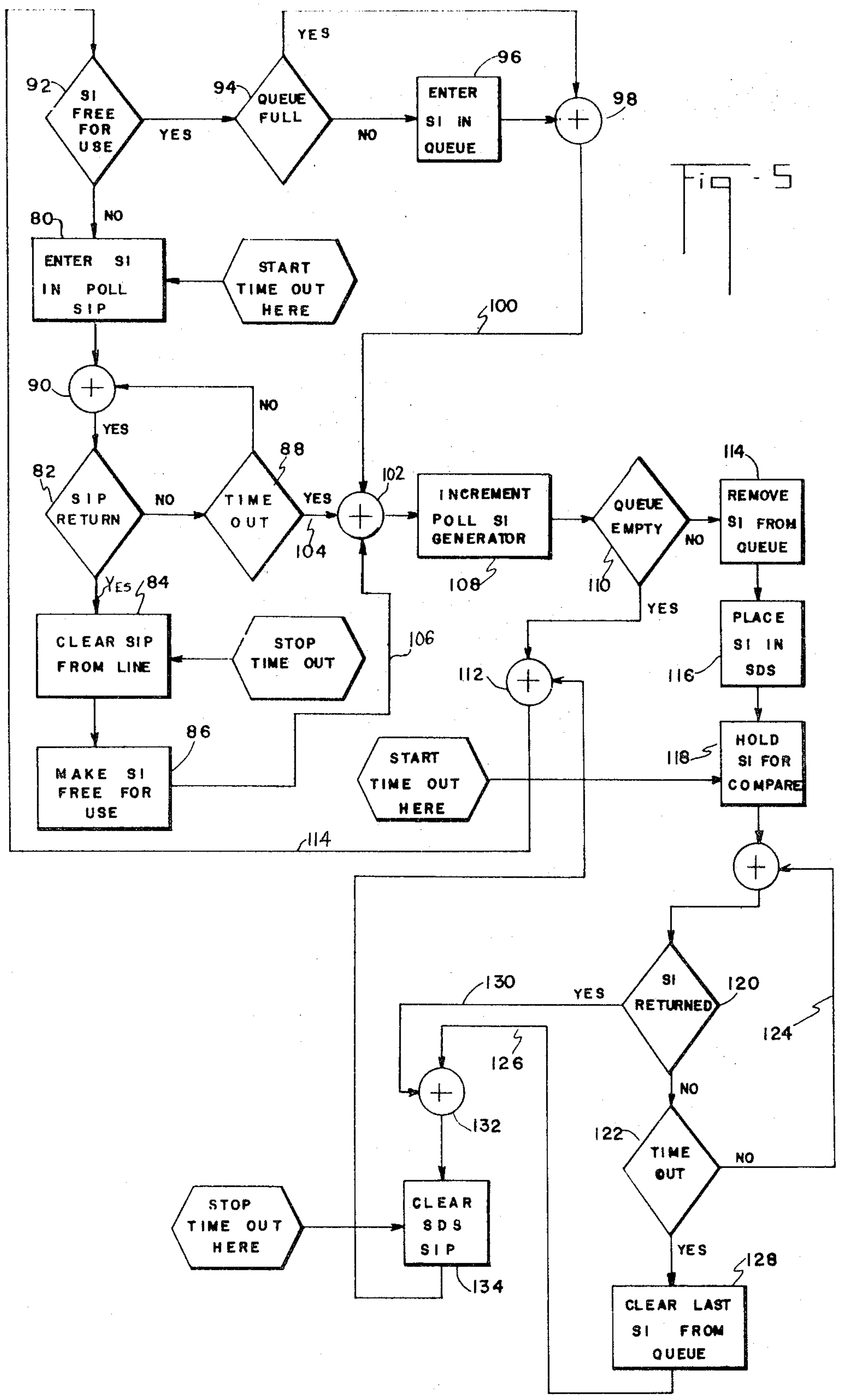
FIG. 5 is a flow chart showing the operation of the SI distribution subperiods (SIP) of the polling subperiods (SIP) in the central SI distributor shown in FIG. 4.

Referring to FIG. 5, there is shown a flow diagram of the operation of the central SI distributor for implementing the SI distribution SIP and the polling SIP described above with reference to FIG. 4. Here, a free SI as determined by a SI Status Memory is entered at 80 into a poll SIP on the line. If this SI is not absorbed by one of the stations of the system, then it is returned at 82 in the poll SIP, cleared from the poll SIP at 84 and the system is instructed to make the SI available for use at 86. On the other hand, if the SI previously sent out in the poll SIP is not yet returned at 82, then the operation is stopped at 82 via Time-Out-Device at 88 which initiates a time-out period within a time out loop consisting of 82, 88 and a gate 90. Gate 90 is an "OR" gate which provides an output when an input appears at either of its inputs. During the time-out period, it is not possible that another SI from the SI Status Memory is entered into a poll SIP at 80 until the polled SI is returned.

As mentioned above, the SI returned on the line in the poll SIP at 82 is cleared from the line at 84 and the system is instructed to make this returned SI available for use at 86. This SI, which has been determined to be free for use, is marked in the SI Status Memory as being free so that it may be entered at the end of a queue containing all SI to be used in the SI distrubution SIP. More specifically, the SI stored in the SI Status Memory at 92 is marked as free for use, and if the queue is not full at 94, then the SI will be entered in the queue at 96. When a SI returns in a polling SIP, the SIP is cleared at 84 and a new SI is written in the polling SIP at 80. Either of two conditions will terminate the time-out loop 82, 88, and 90, these being, first, that a polling SI is returned in the polling SIP, or second, that the time-out period is over. This time-out period is greater than one loop delay in either a closed loop system or an open loop system and hence, of sufficient duration to permit the polling SIP to make a complete circuit in the system. After the time-out period is over or a polling SI is returned, a new SI will be entered in the polling SIP.

If either a queue is full at 94 or a SI is entered in the queue at 96, then an OR-gate 98 is enabled to provide an output on line 100 leading into an OR-gate 102. A second input is provided to the OR-gate 102 via line 104 from the time-out device 88, at such time when the fixed time-out period has ended. A third input is provided to the OR-gate 102 via line 106 when a SI is returned in the poll SIP over the communication line, cleared, and such SI is to be made free for use. Any one of these three inputs on lines 100, 104 and 106 will produce an output from the OR-gate 102 which effects an incrementation of the Poll SI Generator at 108. The Poll SI Generator is a sequencer which produces codes indicative of each address or SI allocated by the Central Address Distributor. The POLL SI Generator is connected at its output to a SI Status Memory which stored all of the SI produced by the generator and maintains a record of all the SI together with an accounting of whether such stored SI are free for use.

Thus, the Poll SI Generator is incremented at 108 from the OR-gate 102 under any of the above three conditions, namely: (a) either the queue is full or a polling SI was just entered in the queue, or (b) the period of time-out device 58 is terminated, or (c) that a poll SI has returned in the poll SIP and is to be made free for use. In this fashion, incrementing of the Poll SI Generator at 108 is used to determine which addresses (SI) are free for use.

Some of those SI which are free for use by stations are stored in a queue which contains those addresses to be entered in the SI distribution SIP. If the queue is empty at 110, then a request is made via OR-gate 112 and its output line 114 for a SI free for use. If, on the other hand, the queue is not empty, a SI is removed from the queue at 114 and placed in the SI distribution SIP at 116. After the SI is sent on the line in the SI distribution SIP, it is held in a register connected to the queue and continuously compared at 118 with the contents in the SI distribution SIP on the line. Once sent on the line this SI, until returned at 120, starts a time-out device 122 having a period greater than one loop delay in either a closed loop system or an open loop system. The time-out loop consists of 120, 122 and line 124 shown. If the time-out period is over at 126 and the SI which was inserted into the SI distribution SIP did not return to the central SI distributor, then the last SI from the queue to be inserted in the SI distribution SIP is cleared from the queue at 128. This is done since the non-return of this SI indicates that it is being used and not free. After the time-out period is over at 126, or the SI is returned in the SI distribution SIP at line 130, an OR-gate 132 provides an output to clear the SI distribution SIP at 134. Once cleared, another SI is inserted in the SI distribution SIP for the next ingoing station to use by the previously described procedure.

Figure 6:
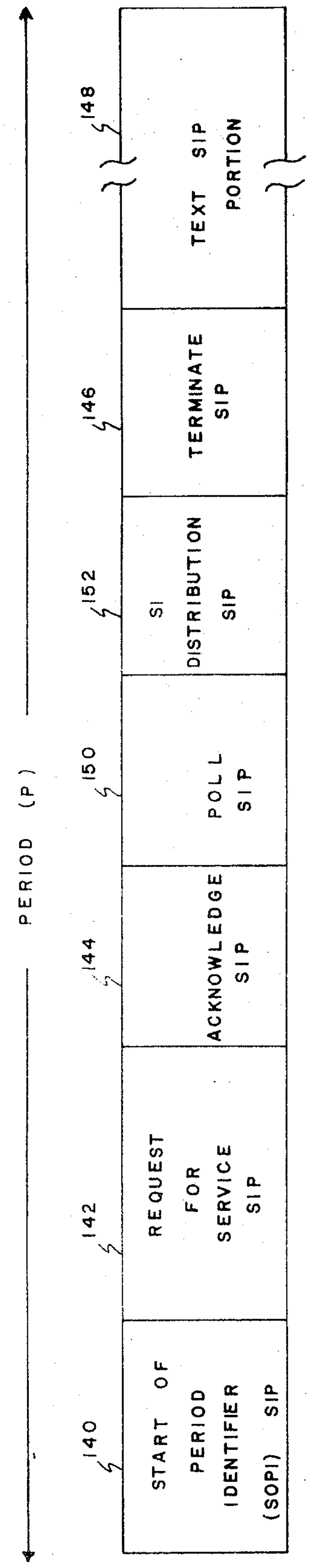
FIG. 6 shows the period (P) structure for implementing the central SI distributor shown in FIG. 4.

Referring to FIG. 6, there is shown the period (P) structure for implementing the central SI distributor shown and described with reference to FIGS. 4 and 5. The period (P) includes a Start-Of-Period-Identifier (SOPI) SIP 140 located at a fixed position within the period so that each station can detect and recognize each of the other individual SIP positions within the period (P). A Request For Service SIP 142, an Acknowledge SIP 144, a Terminate SIP 146 and a Text SIP Portion 148 are provided essentially for use by the member stations and handshaking and message communications between such stations, the details of which will be described hereinafter. As mentioned previously, the central SI distributor determines which addresses or SI are in use on a continuous basis by inserting a SI in a poll SIP 150, shown in FIG. 6. If this SI is removed by one of the stations from the poll SIP 150 or otherwise absorbed by the system, the central SI distributor knows that such poll SI is not available for distribution since it did not return in the poll SIP 150 after a time interval greater than one system loop delay. On the other hand, if the poll SI returns to the central SI distributor in the poll SIP 150 within a given time interval, this indicates that the poll SI is stored in a queue from which it is subsequently made available to stations by inserting it into a SI Distribution SIP 152. As mentioned previously, the period (P), shown in FIG. 6, does not include a SI Return SIP since the return of the SI to the central SI distributor by the stations after use is not required in this embodiment. This is because the employment of the poll SIP 150 maintains a continuous accounting of which SI in the address set are being used at a given time.

Figure 7:
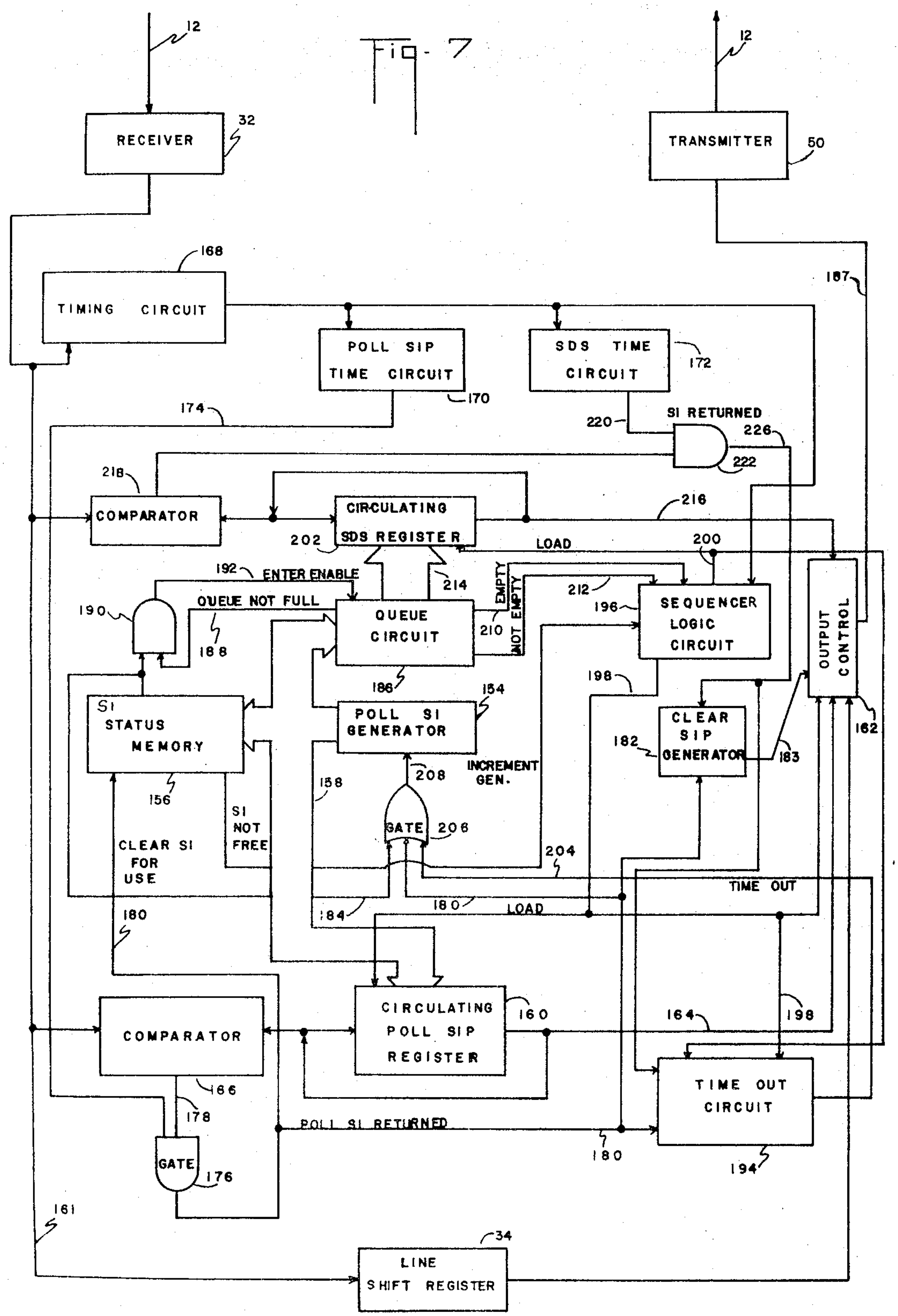
FIG. 7 shows a detailed circuit block diagram of the central SI distributor shown and disclosed with reference to FIGS. 4 through 6.

Referring to FIG. 7, there is shown a detailed circuit block diagram of the central SI distributor 56 connected to receive line information on communications line 12 via Receiver 32 and send line information via Transmitter 50. The central SI distributor 56 includes a Poll SI Generator 154 comprising a sequencer producing codes indicative of each SI allocated by the Central Address Distributor. These codes, or poll SI are stored in a SI Status Memory 156 which stores all of the poll SI produced at the output of the Poll SI Generator 154 and maintains a record of all the SI together with an accounting of whether such stored SI are free for use. The SI Status Memory 156 is comprised of any suitable memory device, such as a random access memory. A SI from the Poll SI Generator 154 is entered via line 158 into a Circulating Poll SIP Register 160 and, at the same time, this poll SI is entered into the poll SIP 150 on the communications line 12 by means of an Output Control Circuit 162, connected to the register 160 by line 164.

A Comparator 166 continuously compares the SI in the Circulating Poll SIP Register 160 with the line information on line 161 from the Receiver 32. A Timing Circuit 168 is connected to the line 161 and provides the timing for a Poll SIP Time Circuit 170 and a SI Distribution SIP Time Circuit 172. During the poll SIP time, a timing signal is provided on line 174 to an And Gate 176 so that the Comparator 166 will detect if the poll SI previously inserted in the Poll SIP 150 and stored in the Circulating Poll SIP Register 160 is being returned on the transmission medium 12 in the same Poll SIP 150. Thus, an output comparator signal on line 178, during the Poll SIP time signaled on line 174, produces an output from And Gate 176 on line 180 indicating that the poll SI was returned in the Polling SIP 150. Since this poll SI was not absorbed by any of the stations of the system and was therefore returned in the Poll SIP 150, the system is instructed to make this SI available for use. This is accomplished by the Poll SIP Returned signal on line 180 which is connected to the SI Status Memory 156. This signal, on line 180, instructs the SI Status Memory 156 that the poll SI stored therein is to be cleared and made free for use. The signal on line 180 also is applied to a Clear SIP Generator 182 which in turn produces a signal on its output line 183 for clearing the Poll SIP 150 in the Line Shift Register 34 via Output Control 162. This poll SI is indicated on output line 184 as being free so that it can be entered into a Queue Circuit 186.

Data in the form of an address count, or SI, is provided on line 158 from the Poll SI Generator 154 to the end of the queue of the circuit 186 which contains some of the available or free SI to be used in the SI Distribution SIP 152. The Queue Circuit 186 receives a SI on line 158. If the poll SI is indicated on line 184 as being free, and the signal on line 188 into an And Gate 190 indicates that the Queue Circuit 186 is not full, then the And Gate 190 provides an Enter Enable signal on line 192 thereby permitting the Poll SI to be entered in the Queue Circuit 186. When a SI returns to the central SI distributor in the Poll SIP 150, the SI is cleared from the transmission medium via the Clear SIP Generator 182, the Output Control 162 and its output line 187.

If the SI previously sent out in the Poll SIP is not returned in such SIP, then a Time-Out Circuit 194 starts a time-out period which is greater in duration than one loop delay in either a closed loop system or an open loop system. As noted previously, this time-out period is used to indicate whether a poll SI has been absorbed by one of the members of the system, since the time-out period begins when the poll SI is first loaded into the Circulating Poll SIP Register 160 and inserted into the Poll SIP 150 by means of the Output Control 162. Initiation of the Time-Out Circuit 194 is provided by a Sequencer Logic Circuit 196 which provides a load signal on line 198 leading to the CIRCULATING POLL SIP Register 160, the Output Control 172 and the Time-Out Circuit 194. The Time-Out Circuit 194 comprises two separate timing circuits, one of which is initiated by the signal on line 198. The second timing circuit is initiated by a load signal on line 200 from the Sequencer Logic Circuit 162, this latter load signal being provided when a Circulating SI Distribution SIP Register 202 is being loaded. In this manner, the load signal on either of lines 198 or 200 from the Sequencer Logic Circuit 196 will initiate the time cycle in one of the circuits in the Time-Out Circuit 194.

Either of the two conditions will terminate the time-out period started by the Poll SIP Load Signal on line 198 into the circuit 194, these being: first, that a poll SI is returned in the Polling SIP 150, or second, that the time-out period runs out on its own. The first of these conditions is caused by the Poll SIP Returned Signal on line 180 leading into the circuit 184. After the time-out period runs out, or the poll SI is returned to the central SI distributor, the Time-Out Circuit provides an output on line 204 leading into the Poll SI Generator 154 via an OR-Gate 206.

The Poll SI Generator 154 has its counter incremented by means of an output signal on line 208 from the OR-gate 206. The Gate 206 provides an output signal for incrementing the Generator 154 under any of the following three conditions, namely: (a) when a signal appears on line 184 from the SI status Memory 156 indicating that a poll SI is free, or (b) when a poll SI is returned in the Poll SIP 150 as indicated on line 180 from the Comparator And Gate 176 or (c) when the period of the time-out circuit 154 is terminated as indicated on line 204. In this fashion the Poll SI General 154 is incremented to the next address, or SI, which is then polled by the same procedure as described above to determine whether such SI is free for use by stations of the system.

As mentioned above, those SI which are free for use by stations are stored in the Queue Circuit 186 containing some of the addresses to be used in the SI Distribution SIP 152. If the Queue Circuit 186 is empty, this condition is indicated as a request on output line 210 to the Sequencer Logic Circuit 196 for a SI free for use. Circuit 196 then provides a Load Request Signal on line 198 to the Circulating Poll SIP Register 160. If, on the other hand, the Queue is not empty, this condition is indicated on line 212 to the Sequencer Logic Circuit 196 which in turn provides a Load Request Signal on line 200 to the Circulating SI Distribution SIP Register 202. The load signal on line 200 enables a SI from the Queue Circuit 186 to be inserted in the Register 202 via line 214. Register 202 sends this SI via line 216 to the Output Control 162 for entry in the SI Distribution SIP 152 on the transmission medium via the line 187. After the SI is sent on the line in the SI Distribution SIP 152 it is held in the Register 202 and compared in Comparator 218 during the SI Distribution SIP time to determine whether such distribution SI has been removed from the line by one of the stations. Once sent on the transmission medium 12, this distribution SI, until detected by the Comparator 218, starts one of the timing sequences in the Time-Out Circuit 194 by means of the load signal 200 from Sequencer Logic Circuit 196. During the SI Distribution SIP time, the SI Distribution SIP Time Circuit 172 provides a timing signal on line 220 leading into an And-Gate 222, which Gate 222 also receives comparator match signals on line 224 from the Comparator 218 and thereby presents an output signal on line 226 indicating that the SI in the SI Distribution SIP 152 is returned. This SI Returned Signal on line 226 is connected to both clear the SIP on the communications line via the Clear SIP Generator 182 and to stop the Time-Out Circuit 194. Once cleared, the load signal on line 200 enables the Register 202 to receive another SI from Queue Circuit 186 for insertion in the SI Distribution SIP 152.

Figure 8:
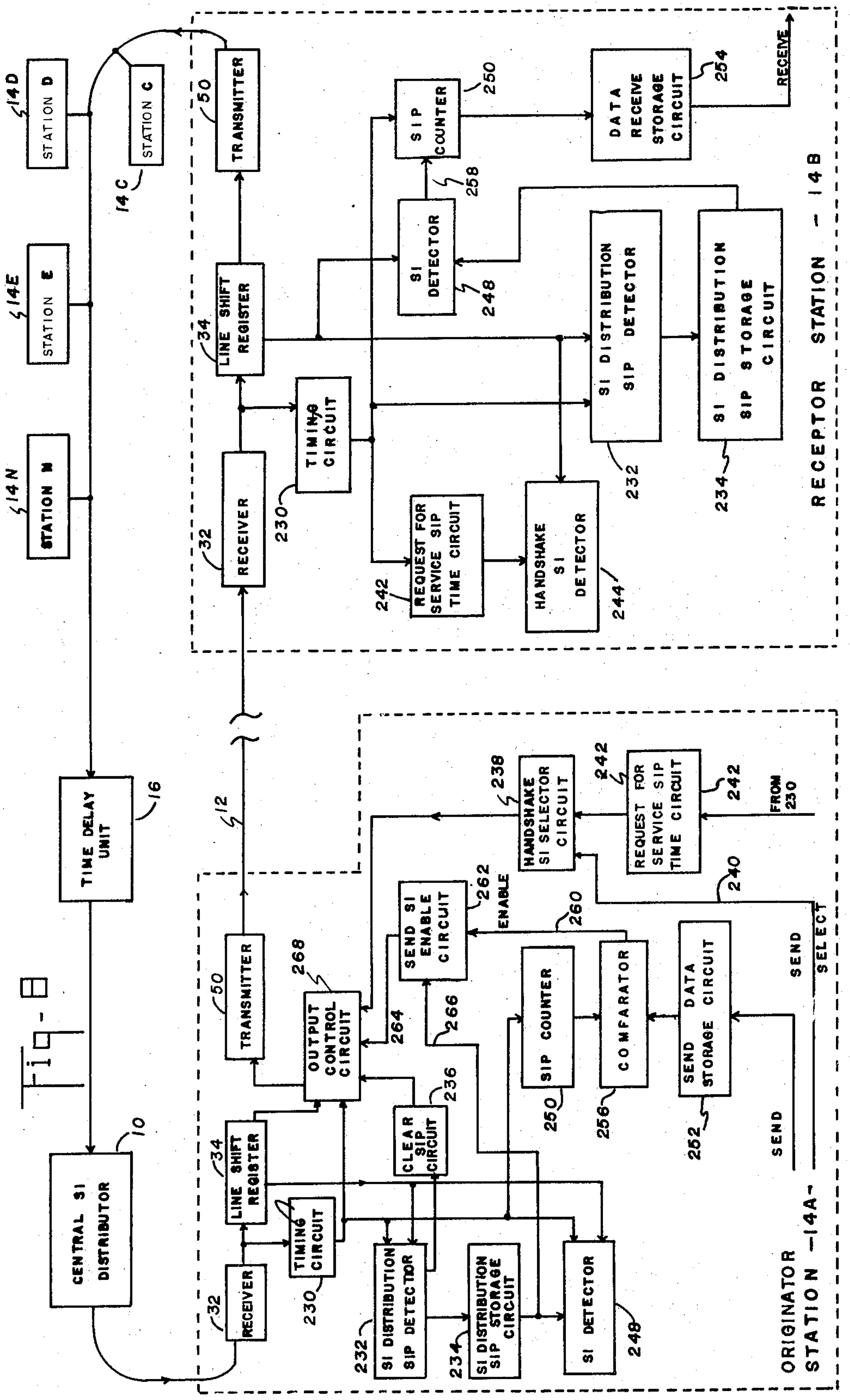
FIG. 8 is a system circuit block diagram showing in detail two communicating stations connected with a central SI distributor in an address-coded data communications system.

Referring to FIG. 8, there is shown a circuit block diagram of two communicating stations 14 connected to an address-coded data communications system employing a central SI distributor 10. For purposes of illustration, the station 14A is an originator station desiring to make communication with a receptor station 14B. As described previously, the station 14A removes and clears an available distribution SI from SI Distribution SIP 152 for use as an identifying address during the communication with receptor station 14B. This is done by means of a Timing Circuit 230 which provides a timing signal at the appropriate SIP time to a SI Distribution SIP Detector 232 for detecting the presence of an available SI in the SI Distribution SIP 152. Detector 232 receives the incoming SI and stores it in a SI Distribution SIP Storage Circuit 234. Once the SI in the SI Distribution SIP 152 is stored in Circuit 234, it is cleared from the line by a Clear SIP Circuit 236 so that this particular SI is unavailable for any other station. A receiver 32, a Line Shift register 34, and a Transmitter 50 are provided at each station and function in an identical manner as the devices indicated by the same numerals located at the central SI distributor.

Once the originator station 14A is off-hook, and the SI Distribution SIP Storage Circuit 234 is loaded with a distributor SI, the originator station 14A enters the "handshake" SI identifying the receptor station 14B into the Request for Service SIP 142. For this purpose, a Handshake SI Selector Circuit 238 is provided and contains a look up table of each of the handshake SI assigned to the individual stations of the system. Alternately, each station may be provided with the handshake SI of only those stations it might be communicating with. The originator station 14A instructs the circuit 238 via a Send Select Line 240 as to which receptor station it desires to communicate with. This Request For Service SIP 142 is located at a fixed position within each period so that any station desiring to communicate with another station simply enters the handshake identifying SI of such receptor station into this SIP 142 at the SIP time provided by a Request For Service SIP Time Circuit 242. In this connection, it is noted that only during this handshake procedure is the permanently assigned handshake SI used for making initial contact with a receptor station. That is, assume that a system comprises 1,000 stations, each having a handshake SI individually assigned. These handshakes SI are used by the stations only for the request for service operation to permit the originating station to direct a signal to alert a receptor station that another station is attempting to communicate with such receptor station. Once a connection has been established between the originator and receptor stations, the distribution SI allocated by the central SI distributor is used for communications. Thus, each station, including the receptor station 14B as shown, includes a Handshake SI Detector 244 which detects the handshake SI located in the Request For Service SIP 142 with the assistance of the Request For Service SIP Time Circuit 242 connected to the Timing Circuit 230. It is noted that where identical reference numerals are employed, identical circuits are intended to be associated with such reference numerals.

Figure 9:
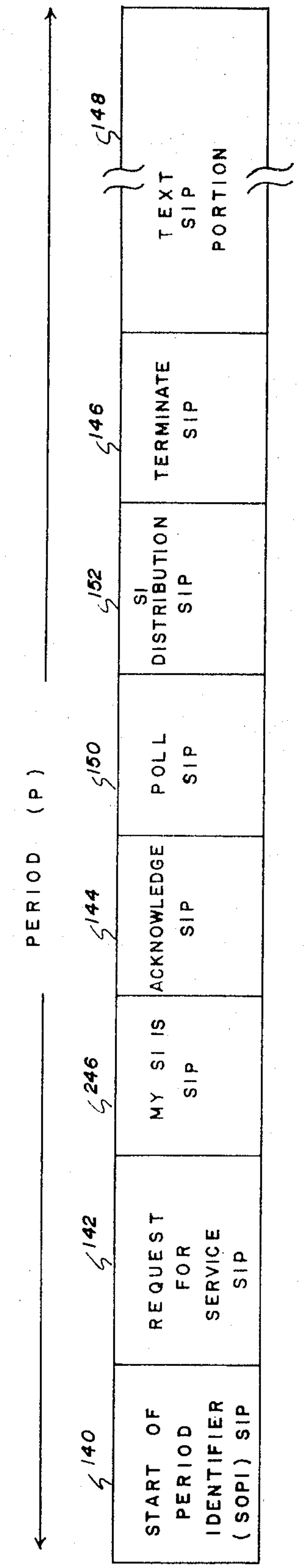
FIG. 9 shows one possible period (P) structure employed in the system of FIG. 8.

Referring to FIG. 9, there is shown one possible period (P) structure wherein a "My SI Is" SIP 246 is assigned to the period structure to permit an originator station to send the allocated distribution SI to a receptor station for storage in the receptor station's SI Distribution SIP Storage Circuit 234, shown in FIG. 8. The Request For Service SIP 142 may be two or more times, i.e., bit capacity, longer than the My SI Is SIP 246, the SI Distribution SIP 152, or each individual SIP within the Text SIP Portion 148. This is because the address set size used for the handshake SI is larger than the address set size used for the distribution SI. The receptor station 14B, after storing the distribution SI in the Storage Circuit 234, is now able to communicate with the originator station 14A using the same distribution SI so that messages sent from one station to the other are detected simply by detecting this particular SI on the line.

An alternative procedure used instead of employing the My SI Is SIP 246 is to employ the SI Distribution SIP 152 for the same function. More particularly, the originator station 14A dials the code of the receptor station 14B by placing the handshake SI of the Receptor station in the first available Request For Service SIP 142. However, if the SI Distribution SIP 142 within the same period (P) is empty, the originator station is ineffective in receiving or conveying a distribution SI to the receptor station 14B. Therefore, the originator station 14A re-attempts in the following Period (P) to receive and communicate a distribution SI by inserting the handshake SI of the receptor station 14B in those available Request For Service SIP 142 until an available distribution SI is detected in the SI Distribution SIP 152 of the same period (P) in which the Request For Service SIP 142 was occupied by the originator station 14A. At the receptor station 14B, the handshake SI of such receptor station 14B is received but not recognized until the available distribution SI is detected in the SI Distribution SIP 152 located in the same period (P) as the Request For Service SIP 142 carrying the SI of the receptor station 14B. When both of these conditions are met, the receptor station 14B stores the distribution SI in its SI Distribution SIP Storage Circuit 234 and removes or clears this SI from the SI Distribution SIP 152 so that it is unavailable to the other stations. It is noted that this alternative technique differs from the prior discussed technique in that it does not require the use of the My SI Is SIP 246 since it instead employs the SI Distribution SIP 152 for the same function. In addition, this alternative techniques requires that the originator station 14A does not clear and destroy the distribution SI from the SI Distribution SIP 152 after such originator station 14A has stored the distribution SI since such distribution SI is to remain on the line for further transmittal to the receptor station. Of course, in order that this alternative technique be successfully employed, all stations within the system will not be permitted to remove a distribution SI from the SI Distribution SIP 152 unless the station recognizes its own handshake SI in the Request For Service SIP 142 located in the same period (P).

The originator and sending stations 14A and 14B, in addition to including the SI Distribution SIP Storage Circuit 234 for storing the distribution SI used during communications, includes a SI Detector 248 connected to both the Line Shift Register 34 and the Storage Circuit 234 for detecting the presence of the SI on the line. The SI Detector 248 is also connected to the Timing Circuit 230 and a SIP Counter 250 to enable the determination of which particular SIP, or SIP counts, the SI are received in or are being sent out in.

Generally each station comprises a Send Data Storage Circuit 252 for storing the binary characters for communication to other stations, a Data Receiver Storage Circuit 254 for storing the text characters after they have been communicated to a given station, and a Comparator Circuit 256 for comparing the binary number representation of data characters stored in the Send Data Circuit 252 with the corresponding counts produced by the SIP Counter 250. Generally, during communication of text data, a station which is receiving information, such as the receptor station 14B, produces a SI detector signal on its output line 258 leading into the SIP Counter 250. The SIP Counter 250 is connected to the Timing Circuit 230 and keeps a running account of the SIP positions appearing on the line at a given station, so as to synchronize each station with the line period information. Upon detection of the distribution SI by the SI Detector 248, the SIP Counter 250 enters the SIP count into the Data Receive Storage Circuit 254 as a data character or message. On the other hand, a station which is sending text data, such as the originator station 14A, presents text data from the Send Data Storage Circuit 252 to a comparator Circuit 256. When the SIP count of the line data corresponds with the data character presented by the Storage Circuit 252 to the Comparator 256, the latter provides an enable signal on line 260 which activates a Send SI Enable Circuit 262. Upon receipt of the enable signal on line 260, the Send SI Enable Circuit 262 transfers the SI received on line 266 from the SI Distribution SIP Storage Circuit 234 to an Output Control Circuit 268. The Output Control Circuit 268 includes gating circuits for entering the SI from the Send SI Enable Circuit 262 onto the transmission medium 12 in the appropriate SIP position. The Output Control Circuit 268 also includes appropriate gating circuitry for entering the handshake SI from the Handshake SI Selector Circuit 238 into the Request For Service SIP 142 during the handshake procedure.

As mentioned above, at certain times a SI will be entered into the Line Shift Register 34 by a station. However, the particular SIP count at which this entry occurs is critical to the transmission of data since the information content or character text is determined by the particular text SIP into which the SI appears. For instance, if the fifteenth text SIP has been designated to represent the letter "0" as between two communicating stations, then the appearance of their distribution SI in the fifteenth SIP will indicate to the receiver station that the character "0" is being transmitted. With such point in mind it is obvious that the writing of a SI into the Line Shift Register 34 can be made only into the particular SIP count position in the period (P) representing the particular data character to be transmitted. To accomplish the entry or writing function into the Line Shift Register 34, the Comparator 256 and the SIP Counter 250 are employed in the following manner. The Comparator 256 compares the binary data submitted by the Send Data Storage Circuit 252 with the binary characters represented by each SIP count that appears in the SIP Counter 250. When a match occurs, the Comparator 256 generates the Enable Signal on line 260 to cause the distribution SI to be sent in the SIP corresponding to the matched SIP count. Each SI that is entered into the Line Shift Register 34 will be read out at another point of transmission medium 12 by the receiver station having been assigned that distribution SI and having substantially identical equipment as the sending station. At the receiver's end, the SI Detector 248 will detect the distribution SI, and together with counting and detection circuits including the Timing Circuit 230 and the SIP Counter 250, will track the incoming information to determine its appropriate SIP position in the period.

From the above, it can be seen that the present invention provides an address-coded communications system wherein the size of the address set required in the system is reduced essentially to the maximum number of stations communicating at any time, resulting in an increase in efficiency of data transfer. Also, the system of the present invention provides flexibility in distributing available communicating addresses on the transmission medium for use by the stations. One further advantage provided by the present invention is that the central SI distributor permits a station to have several communications at a given time. For example, a single station A can use a first SI for communicating with station B while also placing on hold a conversation with station C wherein a second SI is employed between stations A and C, and, also, the station A may be transferring a call to the station D while employing a third SI for communications between stations A and D. In this fashion, the system can flexibly accommodate multiple communications of a given station.

It is to be noted that the above-described system is also designed to operate with some of the stations having permanently assigned SI for communications purposes, while the other stations receive temporary SI assigned by the central SI distributor for the duration of a communications link. This technique of intermixing some permanently assigned SI with the temporary SI assigned by the central SI distributor will provide the stations having permanent SI with immediate access to communications while also permitting the other stations to borrow SI from the central SI distributor. The number of stations borrowing the SI from the central SI distributor can be determined on a basis which optimizes the operation of a given system. This technique serves to permit more stations to share in the allocated number of SI than otherwise possible in a system with only permanently assigned SI. Furthermore, if the stations are communicating over mutually exclusive areas of the system, the same SI can be allocated more than once at any time, thereby increasing the number of simultaneous conversations possible with a given address set size.

Although the above description is directed to preferred embodiments of the invention, it is noted that other variations and modifications of the data processing system will be apparent to those skilled in the art, and therefore, may be made without departing from the spirit of the present disclosure.

What is claimed is:

1. An address-coded data communication system wherein communications between stations is carried out by sending station identifying address codes which permit an intended receiving station to distinguish its own intended data from other data carried on a transmission medium for other stations, comprising:

a generator for producing a set of station identifying address codes;

status means for indicating which of said set of identifying address codes are available and not in use by any of the stations at a given time;

distributor means responsive to said generator and said status means for transmitting available identifying address codes on the transmission medium thereby making said address codes available to stations desiring to communicate;

assignment means for assigning one or more distribution subperiods located at a predetermined position within repetitive periods (P) of time, said distribution subperiods being used by said distribution means for sending said available identifying address codes on said transmission medium;

a distribution subperiod detector at each station and at said distributor means for recognizing said distribution subperiods; and means at each station responsive to said distribution subperiod detector for preempting an available identifying address code for use during communications with one or more stations

2. System as recited in claim 1, further comprising central storage means for holding said available identifying address codes.

3. System as recited in claim 2, wherein said status means include further assignment means for assigning a return subperiod within said period (P) for returning said identifying address codes to said central storage means after two or more communicating stations have terminated a communication, whereby said returned identifying address codes can be made available to other stations.

4. System as recited in claim 3, wherein said further assignment means for returning said identifying address codes to said central storage means includes a return address detector for recognizing in said return subperiod on the transmission medium those identifying address codes being returned by communicating stations after use.

5. System as recited in claim 1, wherein said status means include polling means employing a polling subperiod assigned within said period (P) for polling the stations of the system as to identifying address codes inserted in said polling subperiod to determine which identifying address codes are available and not in use by any of the stations at any given time.

6. System as recited in claim 5, wherein said polling means includes poll sending means for sending identifying address codes, produced by said generator, in said polling subperiod on said transmission medium, means for sensing said polling subperiod to determine if said address codes have been removed by stations from said polling subperiods and are in use by said stations, and a poll detector for indicating to said distributor means which of said identifying address codes sent by said poll sending means are available and not in use.

7. System as recited in claim 1, wherein said distributor means further includes a service request detector for receiving requests by said stations for sending available identifying address codes in said distribution subperiods, said service request detector providing an enable signals to said distributor means.

8. System as recited in claim 1, further comprising at each of said stations:

means responsive to said distribution subperiod detector for receiving an identifying address code from said distribution subperiod on said transmission medium;

storage means for storing said distributed identifying address code; and detection means connected to said storage means for recognizing on the transmission medium that identifying address code which is stored by each station.

9. System as recited in claim 8, further comprising at each of said stations:

means for receiving text data conveyed on said transmission medium with said identifying address codes; and text data storage means for storing said received text data.

10. System as recited in claim 1, further comprising, at each station, clearing means associated with said distribution subperiod detector for removing said available identifying address code from said distribution subperiod on the transmission medium, thereby rendering said removed address code unavailable to other stations.

11. System as recited in claim 1, wherein said stations are connected on the transmission medium in a closed loop communication system.

12. System as recited in claim 1, wherein said identifying address codes are represented in binary digit form.

13. An address-coded data communication system wherein communications between stations is carried out by sending station identifying address code which permit an intended receiving station to distinguish its own intended data from other data carried on a transmission medium for other stations, comprising:

a generator for producing a set of station identifying address codes;

status means for indicating which of said set of identifying address codes are available and not in use by any of the stations at a given time;

central distributor means responsive to said generator and said status means for transmitting available identifying address codes on the transmission medium thereby making said address codes available to stations desiring to communicate;

at each station and said central distributor means, timing means for recognizing each of a multiplicity of discrete subperiods located within each period (P) of chronologically repetitive periods (P) of time;

assignment means associated with said timing means for assigning one or more of said discrete subperiods as a distribution subperiod located at a predetermined position within said period (P), said distributor subperiod being used by said central distributor means for conveying identifying address codes for use by stations;

a distribution subperiod detector, associated with said timing means, at said stations and said central distributor means for recognizing said distribution subperiods; and means at each station responsive to said distribution subperiod detector for preempting an available identifying address code for use during communications with one or more stations.

14. System as recited in claim 13, also comprising:

further assignment means for assigning ones of said multiplicity of subperiods with individual message meanings;

message correlating means at the stations for associating each of a plurality of message meanings with respective ones of said subperiods; and signal sending means, at the sending stations, responsive to said message correlating means for inserting a station identifying address code into the selected subperiods having assigned message meanings corresponding the message means to be transferred;

whereby a receiving station may, in response to a received identifying address code, derive the transferred message meanings corresponding to the subperiods having said received identifying address code.

15. System as recited in claim 13, further comprising at the stations:

means associated with said distribution subperiod detector for removing a detected identifying address code from said distribution subperiod for subsequent use by a given station; and storage means for storing said removed identifying address code.

16. System as recited in claim 15, further comprising, at each station, further assignment means for assigning a return subperiod within said period (P) for returning said identifying address code to said central distributor after use.

17. An address-coded data communication system wherein communications between stations is carried out by sending station identifying address codes which permit an intended receiving station to distinguish its own intended data from other data carried on a transmission medium for other stations; comprising:

a generator for producing a set of station identifying address codes;

status means for indicting which of said set of identifying address codes are available and not in use by any of the stations at a given time;

central distributor means responsive to said generator and said status means for transmitting available identifying address codes on the transmission medium for use by stations desiring to communicate;

at each station and said central distributor, timing means for recognizing each of a multiplicity of discrete subperiods located within each period (P) of chronologically repetitive periods (P) of time;

assignment means associated with said timing means for assigning one or more of said discrete subperiods as a distribution subperiod which is used by said central distributor means for conveying identifying address codes sent by said central distributor means;

further assignment means associated with said timing means for assigning a return subperiod for returning said identifying address codes from the stations to said central distributor means after use; and means at each station responsive to said assignment means for preempting an available identifying address code for use during communications with one or more stations.

18. An address-coded data communication system wherein communications between stations is carried out by sending station identifying address codes which permit an intended receiving station to distinguish its own intended data from other data carried on a transmission medium for other stations, comprising:

a generator for producing a set of station identifying address codes;

status means for indicating which of said set of identifying address codes are available and not in use by any of the stations at a given time;

central distributor means responsive to said generator and said status means for transmitting available identifying address codes on the transmission medium making said address codes available to stations desiring to communicate;

at each station and said central distributor means, timing means for recognizing each of a multiplicity of discrete subperiods located within each period (P) of chronologically repetitive periods (P) of time;

assignment means associated with said timing means for assigning one or more of said subperiods as a distribution subperiod which is used by said central distributor means for conveying identifying address codes sent by said central distributor means;

further assignment means associated with said timing means for assigning a discrete polling subperiod within said period (P) which is used by said central distributor means for the insertion of identifying address codes from said generator;

means associated with said further assignment means and said central distributor means for inserting said address codes in said polling subperiod on said transmission medium;

means associated with said timing means at the stations, for detecting said polling subperiod and for removing the address code inserted therein if said address code is presently being used by a given station; and logic means, included at the input in said status means, for detecting the return of address codes in said polling subperiods and determining which address codes have been removed by stations from said polling subperiods.

19. System as recited in claim 18, further comprising storage means for storing those identifying address codes which have been sent out and returned in said polling subperiod and thereby determined as available and not in use.

20. Method for communicating data over a transmission medium between stations connected in a address-coded data communications system, comprising:

generating, at a central station, station identifying address codes for use by the stations as an identifying code during communications;

indicating, at said central station, which of said generated identifying address codes are available and not in use by any of the stations at a given time;

assigning one or more distribution subperiods located at a predetermined position within repetitive periods (P) of time for distributing said available identifying address codes on said transmission medium;

distributing, from a distributor means at said central station, said available identifying address codes on said trans-mission medium for use by stations as an identifying code during communications by inserting said avail-able identifying address codes into said distribution subperiods, so that the stations or a communication can be distinctly iden-tified by an identifying address code;

detecting, at stations desiring to communicate, said distribution periods and removing said address codes therefrom; and sending, from sending station, said removed identifying address codes with data intelligence on said transmission medium in a form which permits the intended receiving station to recognize the data intelligence from other data carried on the transmission medium by detecting the identifying address code; whereby said identifying address codes are distributed to the system for use by communicating stations as their identifying codes.

21. Method as recited in claim 20, comprising the further step of storing, at said distributor means, said available identifying address codes in a central store for subsequent distribution to said system for use by stations desiring to communicate.

22. Method as recited in claim 21, further comprising the step of returning said identifying address codes from said station to said central store after use by communicating stations.

23. Method as recited in claim 20, wherein said step of indicating which of said identifying address codes are available comprises assigning one or more polling subperiods for polling the stations on a continuous basis as to their use of each address code located in said polling subperiods.

24. Method as recited in claim 20, wherein said identifying address codes are represented in binary digit form.

25. Method as recited in claim 20, further comprising the steps of:

synchronizing the stations by inserting synchronizing signals in each of said periods (P) so that each station may operate in synchronism; and recognizing, at each station and said distributor means, said synchronizing signals and each of a multiplicity of discrete subperiods located within each period (P);

whereby each station may detect the recognizable subperiods on the transmission medium.

26. Method as recited in claim 25, comprising the additional steps of:

assigning each of a plurality of said subperiods with individual data message meanings;

correlating, at each station, each of the subperiods with their respective assigned data message meanings; and inserting, from sending stations, identifying address codes into the selected subperiods having assigned data message meanings corresponding to the message meanings to be transferred; whereby a receiving station may, in response to a received identifying address code, derive the transferred message meanings corresponding to the subperiods having said received identifying address code.

27. Method as recited in claim 25, comprising the further step of storing, at the stations engaging in communications, the identifying address codes sent by said distributor means whereby each communication between stations on the transmission medium is distinguished from other communications by means of transmission of the so stored identifying address code of each station.

28. Method for communicating data between stations in an address-coded data communications system, comprising:

generating, at a central station, station identifying address codes for use by the stations as an identifying code during communications;

indicating, at said central station, which of said generated identifying address codes are available and not in use by any of the stations at a given time;

distributing, from a distributor means, said available identifying address codes on a transmission medium for use by stations as an identifying code during communications so that the stations or a communication is distinctly identified by an identifying address code;

synchronizing the stations so that each station may operate in synchronism with chronologically repetitive periods (P) of time;

recognizing, at each station and said distributor means, each of a multiplicity of discrete subperiods located within each period (P) on said transmission medium;

assigning one or more of said subperiods for conveying said available identifying address codes sent by said distributor means on said transmission medium for use by stations desiring to go on line;

at each station, detecting the distributed identifying address codes located in recognizable subperiods on the transmission medium and removing said detected codes for a station's use during communications;

assigning a return subperiod for returning said identifying address codes from said stations to said distributor means after use;

at said stations, inserting said identifying address codes in said return subperiod so that said returned identifying codes can be made available to other stations; and sending, from sending stations, said identifying address codes with data intelligence on said transmission medium in a form which permits the intended receiving station to recognize the data intelligence from other data carried on the transmission medium by detecting the identifying address code; whereby said identifying address codes are distributed to the system for use by communicating stations as their identifying codes.

29. Method for communicating data between stations in an address-coded data communications systems, comprising:

generating, at a central station, station identifying address codes for use by the stations as an identifying code during communications;

indicating, at said central station, which of said generated identifying address codes are available and not in use by any of the stations at a given time;

distributing, from a distributor means, said available identifying address codes on a transmission medium for use by stations as an identifying code during communications so that the stations or a communication is distinctly identified by an identifying address code;

synchronizing the stations so that each station may operate in synchronism with chronologically repetitive periods (P) of time;

recognizing, at each station and said distributor means, each of a multiplicity of discrete subperiods located within each period (P) on said transmission medium;

assigning one or more of said subperiods for conveying said available identifying address codes sent by said distributor means on said transmission medium for use by stations desiring to go on line;

at each station, detecting the distributed identifying address codes located in recognizable subperiods on the transmission medium and removing said detected codes for a station's use during communications;

assigning a polling subperiod for polling the stations as to their use of identifying address codes located in said polling subperiod;

at said central station, inserting identifying address codes in said polling subperiod to determine if any of the stations is using said address codes; and sending, from sending stations, said identifying address codes with data intelligence on said transmission medium in a form which permits the intended receiving station to recognize the data intelligence from other data carried on the transmission medium by detecting its own identifying address code;

whereby said identifying address codes are distributed to the system for use by communicating stations as their identifying codes.

* * * * *